March 24, 1942.  A. B. McGINNIS  2,277,599
MANUFACTURE OF PLASTIC ARTICLES
Filed Oct. 12, 1937   2 Sheets-Sheet 1
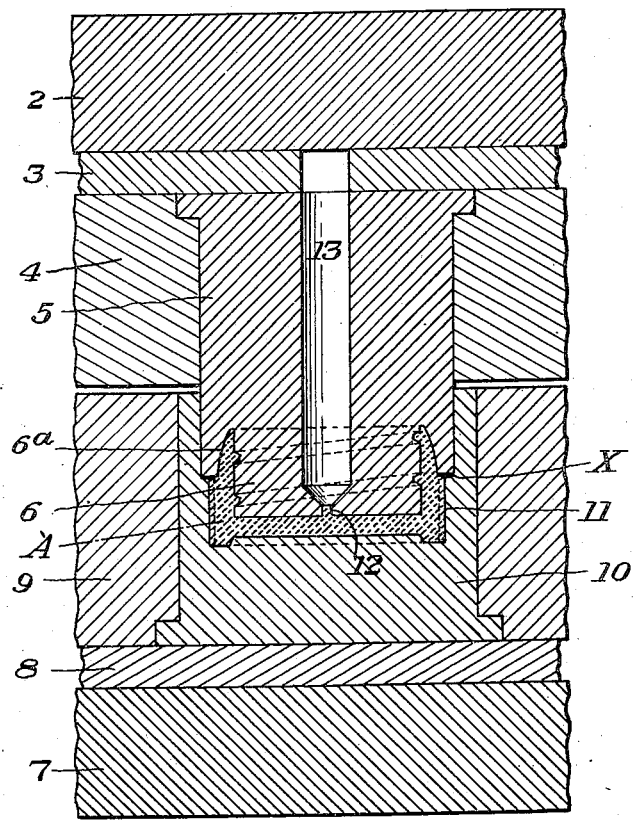
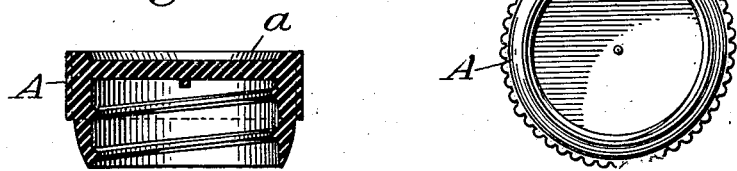
INVENTOR
Archibald B. McGinnis March 24, 1942.   A. B. McGINNIS   2,277,599
MANUFACTURE OF PLASTIC ARTICLES
Filed Oct. 12, 1937   2 Sheets—Sheet 2

INVENTOR
Archibald B. McGinnis

Patented Mar. 24, 1942

2,277,599

UNITED STATES PATENT OFFICE 2,277,599

MANUFACTURE OF PLASTIC ARTICLES

Archibald B. McGinnis, Wheeling, W. Va., assignor to Wheeling Stamping Company, Wheeling, W. Va., a corporation of West Virginia Application October 12, 1937, Serial No. 168,549

2 Claims. (Cl. 18—42)

This invention relates to the molding of articles from plastic material, such as Bakelite and similar resins.

In the molding of certain plastic articles, such, for example, as bottle caps having a relatively large diameter, especially those having a diameter in excess of one inch, it is difficult to secure a flat top for the article. Invariably such articles have an outward bulge which is frequently objectionable. This bulge results from the fact that air or gases are trapped in the mold cavity under the plunger inside the cap. The article is formed flat in the press, but as soon as the pressure is relieved by the opening of the mold, this trapped air or gas expands. The resinous material is at this time still in an elastic state, so that the pressure on the gas produces the bulge, the bulge resulting after the molding operation has been completed.

According to the present invention a small vent is provided in the mold structure. This vent allows for the escape of entrapped gases. At the same time it is of such small diameter that when the plastic material forces up into it, it will harden and not allow any substantial amount of the material to escape from the mold cavity. If it were not for the fact that the vent is small and the material hardens in this fashion, the plastic material could not in its fluid state be kept under sufficient pressure to fill out the mold cavity.

The present invention is also applicable to the molding of applicator caps, as disclosed in my copending application Serial No. 93,013, filed July 28, 1936, wherein one of the mold members is provided with a deep recess for forming an integral applicator with the body of the cap. In a mold of this character, a small orifice is provided in the mold at the end of the cavity which forms the applicator to permit the escape of entrapped gases. In the forming of either flat caps or applicator caps, the cap has a threaded connection with one of the mold caps which serves to effectively confine the gases. Moreover, this threaded connection serves to aid in stripping the article from the mold after the molding operation has been completed by reason of the fact that when the molded article is rotated on the mold member to which it adheres, the threads impart a longitudinal thrust. According to the present invention it is contemplated that the vent holes may be slightly off center so that when the cap is rotated to unscrew it the little tip of plastic material that flows up into the vent hole and, solidifies, being eccentrically positioned, will be sheared off by such turning movement.

The invention may be readily understood by reference to the accompanying drawings, in which—

Figure 1 represents a transverse vertical section through a single mold unit embodying my invention, the parts being shown in the position which they occupy when the mold is closed;

Figure 2 is a transverse vertical section through one type of article, for the forming of which the present invention is adapted;

Figure 3 is a plan view looking into the article illustrated in Figure 2;

Figure 4:
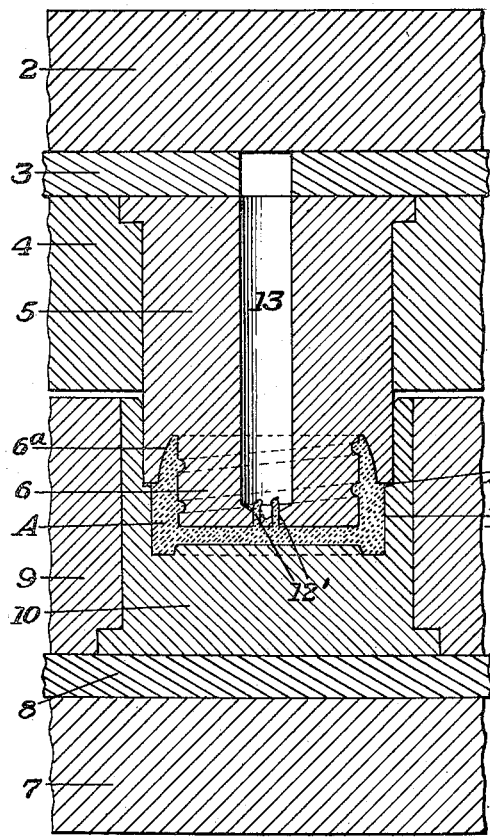
Figure 4 is a view similar to Figure 1 showing a slightly modified arrangement wherein one or more vent holes are provided which are eccentric or off center with respect to the cap.

In the drawings, Figures 2 and 3 are merely illustrative of one form of article and it is to be understood that the invention is in nowise limited to the production of this particular type of plastic article.

Referring to Figures 2 and 3, they show a conventional bottle cap A formed of a plastic material such as Bakelite. It has a flat top a. As heretofore produced, it has been practically impossible, operating on a production basis, to produce the caps with the top portion a absolutely flat. Invariably this bows outwardly, or upwardly, as viewed in Figure 2. By means of the present invention, this difficulty of the cap or other article bulging in this manner is eliminated.

Referring to the drawings, the apparatus illustrated is more or less the conventional molding apparatus. The molds are usually multiple molds and I have illustrated only a single unit, the remainder of the mold block and other apparatus being broken away. In the drawings, 2 designates the fixed bed of a forming press to the under face of which is secured a sub-plate 3. Carried on the sub-plate 3 is a mold block or chase 4 having the stud or plunger portion of the forming die 5 mounted therein. The lower projecting end 6 of the stud 5 is of reduced diameter and is provided with a thread as illustrated. It is also provided with a recess 6a for forming the outermost part of the skirt of the cap. The movable platen of the press is designated 7. It is shown as having a sub-plate 8 thereon and carried on this sub-plate 8 is a mold block or chase 9 in which is mounted a recessed mold member 10. The recess in the mold is designated 11. The recess, of course, is shaped for cooperation with the stud member to produce an article of a kind desired.

So much of the apparatus as has been described is now standard equipment and is generally used in the molding of plastic articles. In use, the mold is opened by dropping the movable platen 7. The article which has been formed adheres to the lower projecting portion 6 of the plunger, from which it is removed either by snapping it off before the plastic material has become rigid, thereby jumping the threads, or by turning the cap to unscrew it from the plunger. The mold is preferably maintained hot, and after an article has been formed and removed a fresh charge of material is placed in the cavity 11 and the mold closed to repeat the forming operation. In the forming operation, the plastic composition passes through a state where it is fluid and it is forced into all parts of the mold cavity. The molds used are what are generally known in the art as "semi-plastic" molds. By this it is meant that the mold cavity is charged slightly in excess of the requirement for making a given article, and the excess material is forced out between the meeting edges of the upper and lower mold members, forming a flash which is broken off in the removal of the cap from the mold. This flash is indicated at X in Figure 1.

As heretofore constructed, the construction of the plunger has been such that air or gas becomes trapped against the under face of the plunger. It cannot escape by reason of the plastic material flowing into the grooves on the side of the forming portion of the plunger to make the thread. When the article has been thus formed and the mold is opened, this trapped gas acting against the molded article produces the bulge hereinbefore referred to.

According to the present invention, this difculty is avoided by forming a vent 12 in the bottom of the plunger, this vent being an opening of small diameter leading from the under face of the plunger to a well 13 extending down from the top of the plunger, the well 13 being of considerably larger diameter than the vent 12. The vent 12 is of such small diameter that when the plastic material forces up into the vent in the initial stages of molding, it quickly sets, forming an obstruction against the further escape of the plastic composition so that the plastic composition fills the mold cavity and the excess escapes between the meeting surfaces of the mold to form a flash. No appreciable amount of plastic material escapes through the vent. In Figures 2 and 3, the part that forms in the vent is illustrated as a small stud or sprue. In the forming operation, the gases and air which are trapped inside the cap being formed, escape through the vent. Accordingly, when the mold is opened there is no confined pressure between the plunger and the article and, therefore, no distortion of the portion $a$ of the article occurs.

The form of invention just described has its particular application to the molding of bottle caps and similar hollow articles, as in the molding of flat or solid articles adequate escape of confined gases occurs at the meeting edges of the upper and lower mold parts.

In the molding of articles of the class to which the present invention relates, the article being formed adheres to one or the other of the two cooperating mold members. There is, of course, no problem encountered in connection with the escape of gases between the article and the mold member to which the article does not adhere, the difficulty arising entirely from the trapping of gas between the articles and that mold member to which the article adheres, and the present invention obviates the difficulty through the provision of a vent in that mold member to which the article clings, or where the article has a threaded engagement with one of the mold members.

In the modification shown in Figure 4, the mold parts and assembly are essentially the same as described in connection with Figure 1, and similar reference numerals have been used to indicate the corresponding parts. However, instead of the vent hole 12 being centrally positioned as shown in Figure 1, the vent hole designated 12' in Figure 4 is eccentrically positioned with respect to the center of the cap and the center of the plunger. This figure also illustrates that there may be two of these eccentric vent holes 12' instead of a single one, it being understood that a plurality may be provided merely to furnish some margin of safety in the event of one of the holes becoming clogged. In the modification shown in Figure 5, the mold is for the production of an applicator cap and the assembly is generally similar to that disclosed in my copending application above referred to. In this figure, 15 designates the upper fixed bed plate of a molding press, to the under face of which is secured a sub-plate 16. Carried on the sub-plate 16 is a mold block or chase 17 having openings 18 therein in which is a stud or plunger portion 19 for forming an applicator cap. The stud is provided with a central recess within which is a sleeve 21, the lower portion of this sleeve having a deep elongated cavity 22 for forming the applicator portion of an applicator cap and having an upper chamber 23 therein, the two chambers being separated by a wall 24. In this wall are one or more eccentric orifices 25 of a small diameter described in connection with Figure 1, the diameter being such as to permit the escape of gases but sufficiently small that the plastic material will solidify as it enters the opening and thereby prevent any substantial portion of the plastic material from escaping.

A movable platen of the press is designated 26. It carries a sub-plate 27 on which is a lower mold block 28, this block having a recess 29 for the reception of a recessed mold member 30 which has a cavity 31 for cooperation with the plunger to form the applicator cap.

Figure 5:
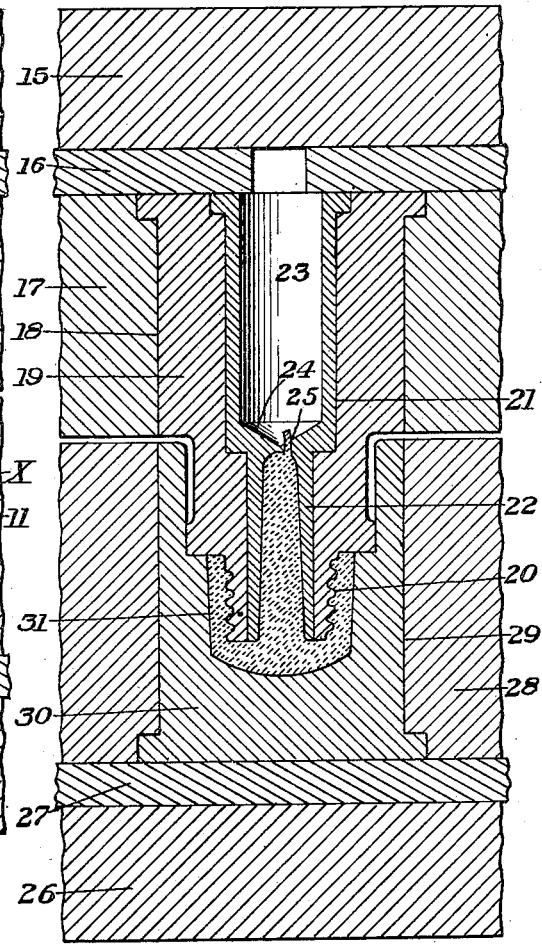
Figure 5 is a vertical section similar to Figure 4 through a mold arrangement for forming applicator caps, wherein the vent is eccentric to the center of the cap and the applicator.

In the operation of the molds of either Figures 4 or 5, the molded article must be rotated on the stud on which it is formed to remove it. By reason of the vent hole or holes being eccentric, the little tip of material that is forced up into the orifice is sheared with this rotating motion so that when the cap is finally stripped from the mold the tip is sheared off and falls clear.

While I have shown and described one particular form of mold, it will be understood that this is for the purpose of illustration and that the invention may be embodied in structures of various forms and is adapted to the molding of various kinds and shapes of articles.

I claim:

1. Apparatus for molding internally threaded closure caps from plastic material comprising an externally threaded mold pin member and a cooperating cavity member free of threads whereby upon removal of the pin from the cavity, the molded cap will be joined to and move with said pin member, said members being adapted for attachment to relatively movable opposed press elements, said force pin member having a vent extending from the free extremity thereof upwardly therethrough and open at all times to atmosphere for relieving pressure inside the molded plastic article before the mold is opened whereby the article will not be expanded by trapped gases when the molding pressure is relieved and while the article remains screwed onto the pin about which it is formed.

2. Apparatus for molding internally threaded closure caps from plastic material comprising an externally threaded mold pin member and a cooperating cavity member free of threads whereby upon removal of the pin from the cavity, the molded cap will be joined to and move with said pin member, said members being adapted for attachment to relatively movable opposed press elements, said force pin member having a vent extending from the free extremity thereof upwardly therethrough and open at all times to atmosphere for relieving pressure inside the molded plastic article before the mold is opened whereby the article will not be expanded by trapped gases when the molding pressure is relieved and while the article remains screwed onto the pin about which it is formed, said vent being positioned eccentrically with regard to the longitudinal axis of the pin whereby the unscrewing of the closure will shear the plastic material that enters the vent.

ARCHIBALD B. McGINNIS.